Jan. 29, 1963 L. J. SCHMAUCH 3,075,379
THERMAL CONDUCTIVITY CELL APPARATUS
Filed Jan. 24, 1957 4 Sheets-Sheet 1

INVENTOR.
Lorenz James Schmauch

BY Everett A. Johnson
ATTORNEY

Jan. 29, 1963  L. J. SCHMAUCH  3,075,379
THERMAL CONDUCTIVITY CELL APPARATUS
Filed Jan. 24, 1957  4 Sheets-Sheet 3

INVENTOR.
Lorenz James Schmauch

BY Everett A. Johnson
ATTORNEY

United States Patent Office 3,075,379
Patented Jan. 29, 1963

3,075,379
THERMAL CONDUCTIVITY CELL APPARATUS
Lorenz James Schmauch, Whiting, Ind., assignor to Standard Oil Company, Chicago, Ill., a corporation of Indiana
Filed Jan. 24, 1957, Ser. No. 636,050
4 Claims. (Cl. 73—27)

This invention relates to the analyses of gases by means of measuring their thermal conductivity.

The analysis of gases for a quantitative determination of gas mixtures by measurements of thermal conductivity is a rather highly developed art. In general, such systems determine the thermal conductivity of a fluid from the changes in resistance resulting from variations in the temperature of an electrical resistance or resistor element heated by an electric current flowing through the resistor and cooled by said fluid which conducts heat from the resistor. The cooling of a resistor by a gas stream depends upon the composition of the gas and upon the rate of flow of the gas in the region of the resistor.

The instrument embodying these principles and conventionally used to measure the relative thermal conductivity is a thermal conductivity Wheatstone bridge wherein matched resistors are exposed to a reference gas and a test gas. The matched resistors are supported within separate chambers of a metal block. The chambers are provided with ports for gas entry and exit. The resistors are connected in the Wheatstone bridge circuit and a voltage is supplied to the circuit to elevate the temperature of the hot-wires above that of their surroundings. The temperature the hot-wires attain for a given supply voltage depends primarily upon the amount of heat lost to the chamber walls through the conductivity of the surrounding gas. When the same gas is present in both chambers, the bridge circuit can be adjusted to a zero output voltage. When the gas composition in the measuring chamber is changed, the resulting hot-wire temperature change alters the resistance of the enclosed wire and this further results in an output voltage that is a measure of the gas composition change.

More practical applications of these techniques require a continuous flow of gas through the measuring chamber of the cell. When the flow is directly over the wire, the forced cooling of the wire results in an undesirably high output voltage. If the unwanted output was steady it could be cancelled by electrical rebalancing, but inherent fluctuations in flow rate produce fluctuations in the output voltage that reduce the accuracy of the thermal conductivity measurement.

One solution to such flow sensitivity heretofore proposed has been to provide an identical flow of reference gas to the reference chamber. This reduces the undesirable effect, but it is difficult to attain a complete cancellation. A second proposal has been the re-arrangement of gas entry to the measuring chamber so that the gas composition in the measuring chamber changes through gas diffusion. However, undesirable long times are required for these cells to respond to composition changes and this is a disadvantage in applications where gas composition changes rapidly and must be followed quickly.

Several types of detectors have been proposed and tried for sensing the presence of the components in the eluting gas of a gas chromatographic column. A principal type of detector is the thermal conductivity cell and it is with respect to this type of detector that my improvement particularly is directed as applied to gas chromatography.

Gas chromatography, a new and useful technique for separation and analysis of hydrocarbons, alcohols, ethers, esters, ammines, fatty acids, and alkyl halides, is a system wherein components are separated in simple and inexpensive equipment by partition between a stationary liquid phase and a moving gas phase. A few microliters of sample can be analyzed in 20 to 60 minutes and the technique is applicable to samples ranging from those that boil below room temperature to those that can be distilled at low pressure.

The separation results from differences in the distribution or partition of the compounds. The moving gas phase, called the eluting gas, passes over a stationary liquid phase which is supported on many particles of an inert solid in a chromatographic column. The liquid, amounting to about 40 wt. percent of the solid, is distributed as a thin film that provides a large surface for the gas to contact.

Variables that affect separation are column length, flow rate of the eluting gas, temperature, and the chemical nature of the stationary phase. If, for example, one component of a binary mixture is insoluble in the stationary phase and the other at least partially soluble, then a separation will take place. The first component will remain in the gas phase and be swept through the column at nearly the velocity of the eluting gas. The second component, however, will pass through the column at a lower rate because the process of dissolving in and escaping from the stationary liquid phase takes additional time. Because of differences in partition, the two components emerge from the column in the eluting gas at different times and thus are separated.

A flow rate of eluting gas is selected to give an adequate separation in a reasonable length of time, the usual range being 5 to 75 ml. per minute. The lower flow rates are useful for improving difficult separations because of the increased contact time in the column. A lower limit is imposed by greater length-wise diffusion which leads to remixing the components. The components are separated as they pass through the column and are detected as bell-shaped bands as they emerge in the eluting gas and their concentration is plotted against time in the recording. An analysis usually takes 20 to 60 minutes.

With gas mixtures having components that are eluted in very close proximity to one another, any overlap of the bell-shaped bands, i.e. incomplete resolution, interferes with the ability (1) to calculate accurately the amounts of each component, and (2) to obtain pure components where recovery of the component for subsequent use is desired. To minimize any contribution by the cell to increasing this band overlap, the response of the cell to change in composition of the gas must be fast. However, it is also desired that the cell be substantially insensitive to flow rate therethrough.

In view of the above, it is a primary object of my invention to provide a thermal conductivity cell which is designed to reduce sensitivity to flow rate while retaining a fast response. A further object of the invention is to provide a thermal conductivity cell which is particularly suited for gas chromatography. Another object of the invention is to provide a method and apparatus for measuring thermal conductivity of gas and vapor mixtures wherein the effect of rate of flow is avoided while being highly responsive to composition changes. These and other objects of the invention will become apparent as my description thereof proceeds.

Briefly, I attain the objects of my invention by providing thermal conductivity cells where the hot wires are shielded from the direct gas flow but located close enough to the measured stream for good response. Such shielding may be obtained by placing barriers in the flow path both upstream and downstream of the hot wire. The shielding reduces the flow sensitivity while proximity of the wire to the gas stream assures the fast response.

In the preferred embodiment, the sensing element is in the form of a compact helical unit so that the gas front contacts all parts of the element at nearly the same time.

In this way, response becomes substantially independent of flow rate of the sample. Further, by providing a chamber of low holdup volume, the response time is decreased and the low sensitivity to flow rate is attained by the shielding design. In the improved apparatus, the response time has been reduced to about one second at low flow rates.

I have improved this type of thermal conductivity cell by attaining a balance between these opposing effects whereby the cell has a very rapid response (of the order of one second) and is substantially insensitive to flow rates in the range of about 5 to 75 ml. per minute. Further, I may operate my cell even at higher temperatures of the order of 195° C. and still obtain very stable base lines, adequate signal output, and very fast response.

Further details of the invention will be apparent as preferred embodiments thereof are described in connection with the accompanying drawings wherein.

Figure 10:
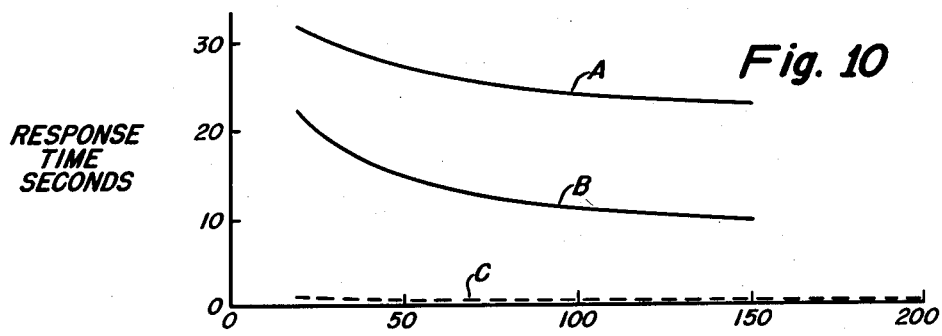
Figure 11:
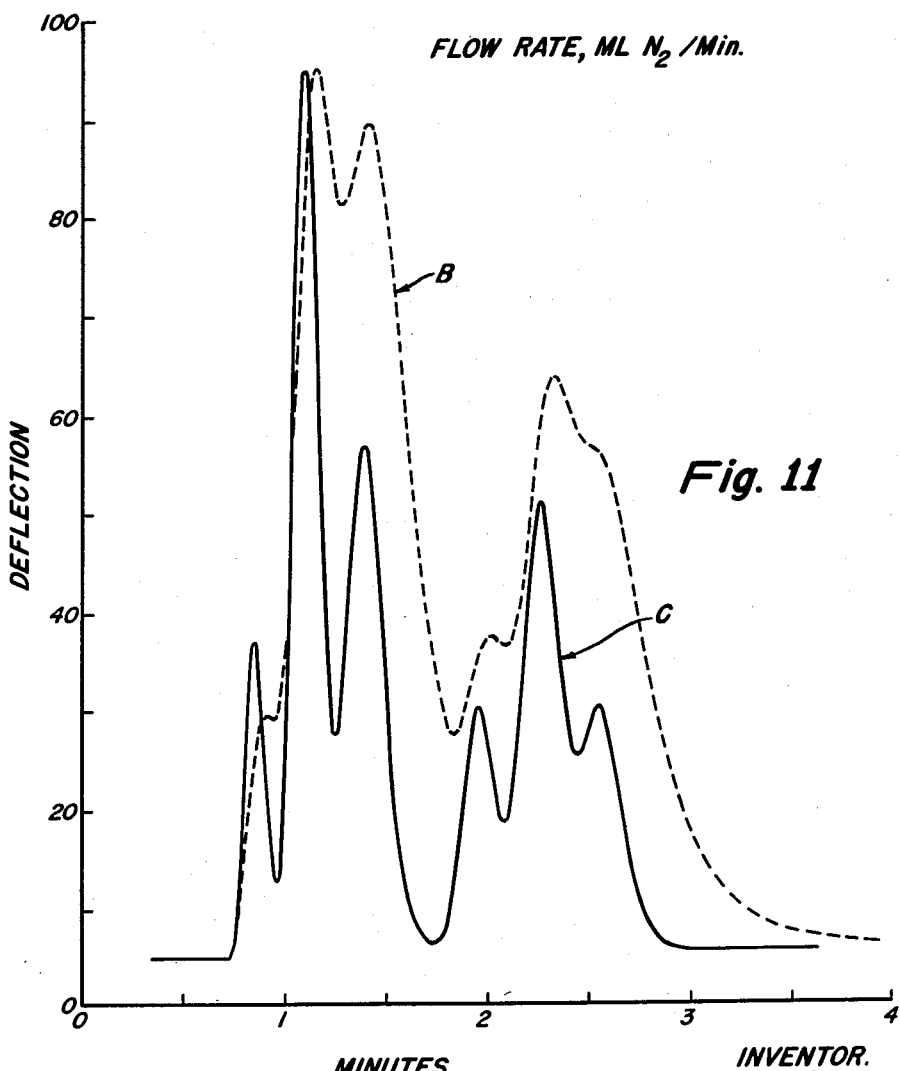

FIGURE 10 is a series of curves based on data which compares the cell responses of commercially available thermal conductivity cells with a cell embodying my invention; and FIGURE 11 compares the chromatogram recorded through the use of the cell according to the invention with the chromatogram recorded through the use of a competitive cell; both records being obtained at 20 ml./min. flow through each cell.

Figure 1:
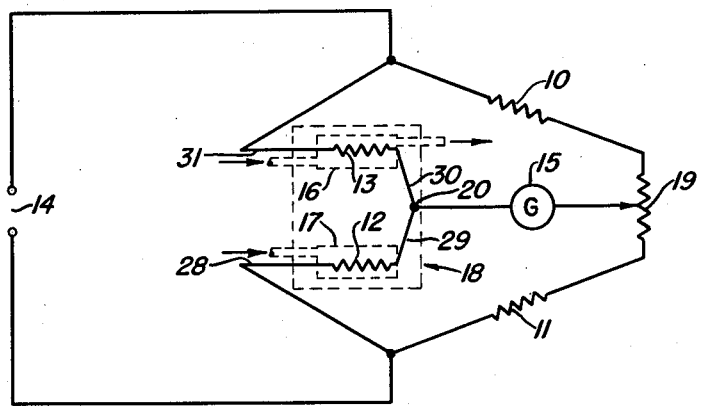
FIGURE 1 is a schematic view of a thermal conductivity cell and circuit.

Refering to FIGURE 1, there is shown a Wheatstone bridge circuit with standard resistances 10 and 11 and the analyzing resistance hot wires 12 and 13 together with the usual voltage supply 14 and an output voltage indicating means such as galvanometer 15. This general type of circuit and its operation are well known and will not be described in further detail.

The measuring chamber 16 contains the hot wire 13 and the reference chamber 17 contains the reference hot wire 12. The hot wires 12 and 13 are preferably precise lengths of coiled tungsten wire. The two chambers 16 and 17 are preferably contained within the same block 18 which may be cylindrical and may be enclosed within a vapor jacket for use with higher boiling hydrocarbon compounds.

Figure 2:
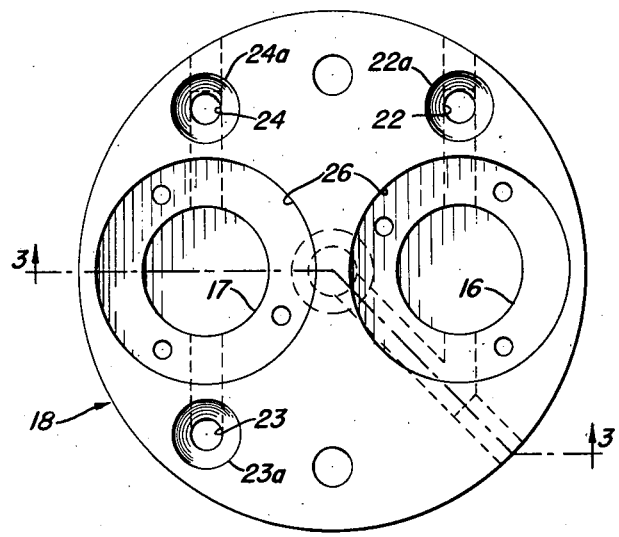
FIGURES 2 and 3 are bottom and side views, respectively, of a preferred cell block, FIGURE 3 being partly in section.
Figure 3:
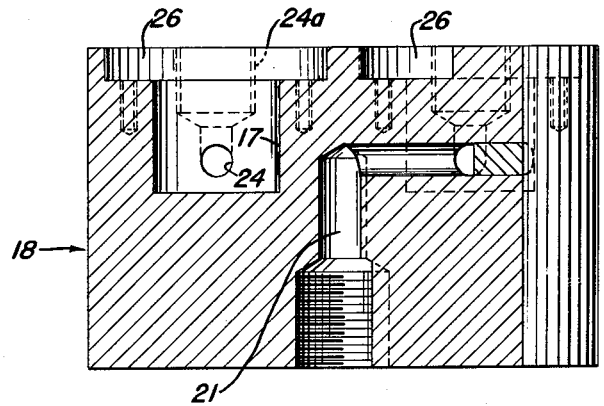

Referring to FIGURES 2 and 3, I have illustrated a preferred form of a block 18 provided with reference and measuring chambers 17 and 16. The depth of the chambers 16 and 17 has been selected for compactness in design and low hold-up volume, each being about 5/16 inch in depth and about 0.5 inch in diameter to accommodate a wire mount and flow shield, a preferred form of which is shown in FIGURES 6, 7, 8 and 9.

The block 18 is provided with inlet channel 21 which enters one side of the chamber 16 at about its mid-point and leaves it by outlet channel 22, likewise communicating with the chamber 16 at its mid-point and leaving the block 18 from the top thereof as shown. The reference chamber 17 is similar to measuring chamber 16 and is provided with ducts 23 and 24 communicating with the chamber 17 at its mid-point and terminating in female-threaded sections 23a and 24a for connection to gas conduits.

Figure 7:
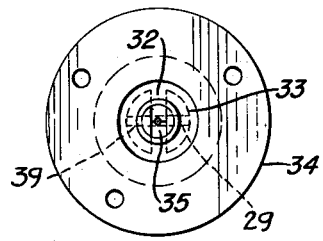
FIGURES 7 and 8 are top and bottom views of the wire mount of FIGURE 6.
Figure 8:
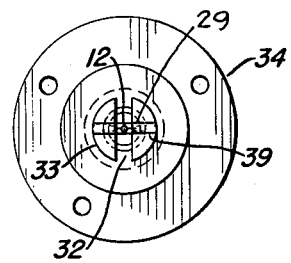
Figure 9:
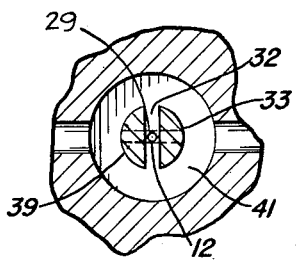
FIGURE 9 is a section taken along the line 9—9 in FIGURE 6.

Each of the chambers 16 and 17 is provided with a recess 26 to receive the flanged unit of FIGURES 7 and 8 having electrical leads 28—29 and 30—31 connected to the indicated hot wire 12 and 13, respectively, in the Wheatstone bridge circuit as schematically shown in FIGURE 1. Leads 29 and 30 are grounded to the block 18 by contact with the flanged unit as shown schematically at point 20 in FIGURE 1. Each wire mount and flow shield unit of FIGURES 7 and 8 has a pair of imperforate columnar flow barrier means for distributing the gas flow over the full depth of the chamber 16 or 17 and for avoiding impingement of the hot wires by the flowing stream.

Figure 4:
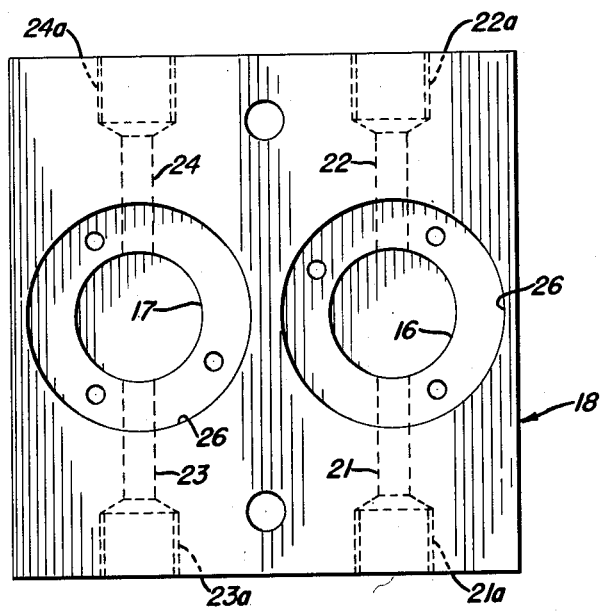
FIGURES 4 and 5 are bottom and side views of another embodiment of my apparatus.
Figure 5:
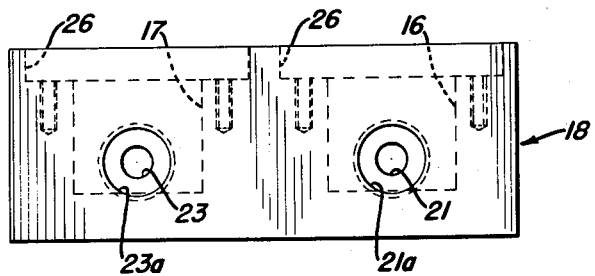

FIGURES 2 and 3 of the drawings show the structural features. Another embodiment of the cell blocks is shown in FIGURES 4 and 5. The cell block 18, shown in FIGURES 2 and 3, can be connected directly to a glass or metal chromatographic column and heated in a vapor jacket, which is also used for heating the column. Heating is desirable since it prevents condensation within the individual cells or chambers.

The cell block illustrated by FIGURES 4 and 5 may be mounted for ambient temperature service when condensation is not a problem.

In FIGURES 6 to 9, the hot wire 12 or 13 is located within 1/16 inch longitudinal slot 32 through the bifurcated cylindrical body 33 which is fixed to the end flange 34. The leads 28 or 31 pass through the insulator 35 and are connected to hot wires 12 or 13 which pass downwardly within the slot 32 along an axis parallel to the slotted cylinder 33 and are affixed to a wire mount comprising leads 29 or 30 in the transverse channel 39 across the bottom ends of slotted cylinder 33.

The chamber being ½ inch in diameter and the flow distributor body 33 being ¼ inch in diameter, there remains an annular divided flow channel 41 from which gas flow, into slot 32 and adjacent the hot wire coil 12 or 13, is suitably dampened to substantially eliminate sensitivity to flow rate. However, the rate of dampened flow into and out of slot 32 from each side is sufficient to provide fast response.

In FIGURES 6, 7, 8 and 9, the shielding barrier 33 comprises imperforate cylindrical segments disposed upstream and downstream of the hot wire coil or filament. The hot wire 12 or 13 is supported at one end by electrical lead 28 or 31 through insulator 35 and at the other by recessed electrical cross-wire lead 29 or 30 in channel 39, said lead being electrically connected to the shield 33 and hence also to block 18 (FIGURE 2) and terminal 20 (FIGURE 1). It is also contemplated that the hot wire coils 12 or 13, their leads 28 or 31 and 29 or 30, and insulator 35 can be arranged as a removable subassembly to facilitate interchange and replacement of the hot elements within barrier shields 33—34.

The dimensions of the flow shield 33 markedly control the flow sensitivity while having a lesser effect on the response time. In my preferred arrangement, the shields or barriers 33 extend substantially the entire depth of the chambers 16 and 17, are spaced about ⅛ inch from the walls of said chambers, and provide annular flow paths about the shields within the chambers 16 and 17. For flow rates suitable for use in gas chromatography, the cell is relatively insensitive to flow even when the slot 32 is rotated as far as about 15° from the position shown in the drawings.

FIGURE 10 shows the response time v. flow rate for my thermal conductivity cells using flow distributors shown in FIGURES 6 to 9 as compared with two commercially available thermal conductivity cells A and B of a diffusion type. The response time is taken as the time required for the cell to give about 63% of its final output after the gas composition is changed at the entrance port 21. From FIGURE 10, it will be apparent that the response times of my cells are vastly improved over two commercial cells.

Tables I and II, set out below, give the flow sensitivity and response characteristics imposed by the dimensions of the shielding inserts which were as follows:

| Insert | Diameter of Body 33, inches | Width of Slot 32, inches | Length of Slot 32, inches |
|---|---|---|---|
| C | 0.250 | 0.069 | 0.239 |
| D | 0.312 | 0.069 | 0.304 |
| E | 0.281 | 0.069 | 0.272 |
| F | 0.250 | 0.104 | 0.185 |
| G | 0.250 | 0.104 | 0.232 |

In each instance, the chamber (16 and 17 in the drawing) was 0.5 inch in diameter with a depth of 5/16 inch when one of the wire mount-flow shield bodies C to G was in place.

It will be noted that flow sensitivity can be varied over a wide range. However, the lower flow sensitivity of shield inserts C, D and E are more desirable. Each of these gives satisfactory results for gas chromatography work below 100 ml. nitrogen per minute. The dimensions of the flow shield body 33 can be further altered to reduce the flow sensitivity.

TABLE I
*Flow Sensitivity of Thermal Conductivity Cell*

| Flow Rate, ml. N₂/min. | Mv. Unbalance for Insert | | | | | Control T/C Cell |
| | C | D | E | F | G | |
|---|---|---|---|---|---|---|
| 300 | 0.98 | 0.24 | 0.75 | 9.7 | 7.4 | 0.30 |
| 250 | 0.62 | 0.13 | 0.36 | 5.3 | 4.2 | 0.21 |
| 200 | 0.33 | 0.09 | 0.16 | 2.5 | 2.3 | 0.13 |
| 150 | 0.12 | | 0.06 | 1.1 | 1.0 | 0.074 |
| 100 | | | | 0.4 | 0.4 | 0.035 |

In obtaining these data, all shielding inserts had 58 ohm (at 25° C.) tungsten coils in a Wheatstone bridge circuit which is about symmetrical at the operating currents. The currents were sufficient to raise the coil temperatures to about 200° C., the output sensitivities being comparable with the adequately insensitive control cell and the flow sensitivity data are directly compared.

TABLE II
*Response of Thermal Conductivity Cell*

| Insert: | Response¹ |
|---|---|
| C | 1.0 |
| D | 2.2 |
| E | 1.7 |
| F | 0.7 |
| G | 0.7 |
| Control Cell | 6.3 |

¹ Seconds for 63% of final output for a square wave at 20 ml./min. flow rate.

Accuracy of the measurements were limited by the 1-second pen response of the recording potentiometer used in obtaining these data. For this reason, measurements were not made at higher flow rates where the response values become lower.

Measuring of rapidly changing concentrations of components in a gas stream requires cells having fast response time. In gas chromatography, such concentration changes appear as gaussian-shaped bands. These bands can be very sharp, indicating rapid concentration changes, and it has been estimated that very nearly the true shape of the band will be measured by a cell whose response time is 0.1 or less of the band width at half-the-peak height.

Figure 6:
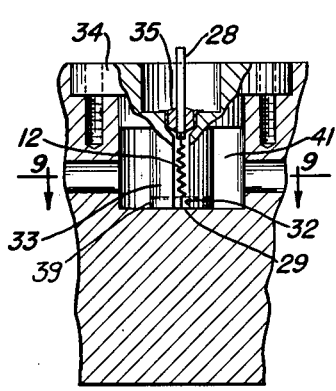
FIGURE 6 is a fragmentary elevation, partly in section, of a preferred wire mount for use in the block of FIGURES 2, 3, 4 and 5.

Of the three shielding barriers C, D and E (preferred for their low flow sensitivity), C gives the best measurements of sharp bands. For cells of comparably low flow sensitivity, the cell illustrated by FIGURES 1 and 2 and the shielding insert C illustrated in FIGURE 6 is superior to other thermal conductivity cells at low flow rates. In Table II above, it is noted that the response times are of the order of one second with the preferred embodiment of my invention and about six seconds with an earlier design of thermal conductivity cell used here as the control cell.

The effectiveness of a fast cell has been demonstrated by using it as a detector in gas chromatography. A test mixture of $C_5$ and $C_6$ paraffins and olefins was separated on a chromatographic column into a series of sharp bands in a nitrogen gas stream. The stream was split into equal and parallel streams which were passed into a thermal conductivity cell of the type described herein and through a commercial cell. FIGURE 11 shows the measurements made by each cell. Band widths are about 20 seconds and would require response times of 2 seconds or less for best reproduction. The higher peak-to-valley height ratios shown by the solid line in FIGURE 11 are evidence of the effectiveness of the faster response obtained by employing the apparatus described herein and illustrated by the drawings.

The performance illustrated in FIGURES 10 and 11 clearly indicates that I have attained the general and specific objects of my invention and have provided thermal conductivity cells which are of wide utility and extreme accuracy.

This application is a continuation-in-part of my co-pending application Serial No. 559,225, filed January 16, 1956, and entitled "Thermal Conductivity Cell," now U.S. 2,926,520.

The invention has been described in terms of specific examples including a preferred embodiment set forth in some detail, but it should be understood that these are by way of illustration only and that the invention is not necessarily limited thereto. Alternative constructions will become apparent to those skilled in the art in view of my disclosure and, accordingly, modifications of my apparatus and operating techniques are to be contemplated without departing from the spirit of my described invention.

What I claim is:

1. In a thermal conductivity cell having a metal block of high heat transfer capacity, a shallow cylindrical chamber extending inwardly of one face of said block and closed at its inner end, a first conduit communicating with said chamber at substantially the mid-point of its depth, a second conduit communicating with said chamber at substantially the same depth as said first conduit, the outlet of said first conduit and the inlet of said second conduit being substantially in axial alignment, a removable closure across the outer open end of said chamber, a hot wire sensing element having one end supported by said closure and electrically insulated therefrom, said hot wire sensing element being axially aligned with said chamber and normal to the flow of a sample stream, imperforate columnar flow barrier means carried by said closure and extending substantially to the inner closed end of said chamber, said barrier means being arranged symmetrically in tandem between said first and second conduits and uniformly diverting flow of the sample stream around said hot wire sensing element and shielding said hot wire sensing element from direct impingement by said stream, and means at the lower end of said barrier means supporting the other end of said hot wire sensing element, the improvement affording a reduced response time of said thermal conductivity cell and a response substantially independent of sample flow rate, which consists of a hot wire sensing element comprising a compact helical coil disposed along an axis parallel to said barrier means and normal to the flow of sample stream, whereby the sample stream contacts all parts of the sensing element at substantially the same time and whereby the volume of said cylindrical chamber may have a low holdup volume for decreased response time.

2. The cell of claim 1 wherein said barrier means comprises a longitudinally-slotted cylindrical projection of said closure, said barrier having a diameter equivalent to about one-half the diameter of said chamber.

3. The cell of claim 1 wherein said chamber has a diameter of about ½ inch and a depth of about 5/16″, and the barrier means are segments of a cylinder having a diameter of between 3/16″ and 3/8″, said barriers being spaced apart between 1/32 and 3/16 inch.

4. The cell of claim 1 wherein said coil has a length not greater than about 0.25 inch and a diameter not greater than about 0.05 inch.

References Cited in the file of this patent

UNITED STATES PATENTS

| | | |
|---|---|---|
| 2,171,502 | Gow | Aug. 29, 1939 |
| 2,298,288 | Gerrish et al. | Oct. 13, 1942 |
| 2,326,884 | Phelps | Aug. 17, 1943 |
| 2,557,008 | Poole | June 12, 1951 |
| 2,687,036 | Minter | Aug. 25, 1954 |
| 2,693,103 | Krupp | Nov. 2, 1954 |
| 2,926,520 | Schmauch | Mar. 1, 1960 |